US012212061B2

(12) United States Patent
Tsuchiya

(10) Patent No.: US 12,212,061 B2
(45) Date of Patent: Jan. 28, 2025

(54) ANTENNA APPARATUS

(71) Applicant: NEC Platforms, Ltd., Kawasaki (JP)

(72) Inventor: Masato Tsuchiya, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 143 days.

(21) Appl. No.: 17/893,582

(22) Filed: Aug. 23, 2022

(65) Prior Publication Data

US 2023/0076815 A1 Mar. 9, 2023

(30) Foreign Application Priority Data

Sep. 6, 2021 (JP) ................................ 2021-144679

(51) Int. Cl.
*H01Q 13/16* (2006.01)
*H01Q 21/20* (2006.01)

(52) U.S. Cl.
CPC ........... *H01Q 13/16* (2013.01); *H01Q 21/205* (2013.01)

(58) Field of Classification Search
CPC ............................ H01Q 13/16; H01Q 21/205
See application file for complete search history.

(56) References Cited

U.S. PATENT DOCUMENTS

| | | | | |
|---|---|---|---|---|
| 9,711,861 | B2 * | 7/2017 | Kashino | H01Q 13/106 |
| 2003/0148784 | A1 | 8/2003 | Sawamura et al. | |
| 2012/0268343 | A1 | 10/2012 | Yanagi et al. | |
| 2018/0212305 | A1 | 7/2018 | Wei | |

FOREIGN PATENT DOCUMENTS

| | | | |
|---|---|---|---|
| JP | 2002-368850 | A | 12/2002 |
| JP | 2008-172697 | A | 7/2008 |
| JP | 2012-175422 | A | 9/2012 |
| JP | 2012-231266 | A | 11/2012 |
| JP | 2017-212685 | A | 11/2017 |
| WO | 2011/145695 | A1 | 11/2011 |
| WO | 2015/141133 | A1 | 9/2015 |

OTHER PUBLICATIONS

JP Office Action for JP Application No. 2021-144679, mailed on Nov. 14, 2023 with English Translation.
JP Official Communication for JP Application No. 2021-144679, mailed on Jul. 23, 2024 with English Translation.

* cited by examiner

*Primary Examiner* — Graham P Smith

(57) ABSTRACT

An antenna apparatus including an antenna capable of having both a wide-band characteristic and an omni-directional characteristic is provided. An antenna apparatus according to the present disclosure includes a feeding antenna, and a passive element part disposed in a Z-direction of the feeding antenna, in which the passive element part is disposed in parallel to an XY-plane orthogonal to the Z-direction, is made of a conductor, and includes a passive element with a plurality of slots formed therein.

6 Claims, 13 Drawing Sheets

ANTENNA APPARATUS

INCORPORATION BY REFERENCE

This application is based upon and claims the benefit of priority from Japanese patent application No. 2021-144679, filed on Sep. 6, 2021, the disclosure of which is incorporated herein in its entirety by reference.

TECHNICAL FIELD

The present disclosure relates to an antenna apparatus, and in particular to an antenna apparatus including an antenna capable of having both a wide-band characteristic and an omni-directional characteristic.

BACKGROUND ART

In recent years, as 5G (5th Generation Mobile Communication System) has become widespread, there has been a tendency to increase (or widen) the frequency bands that mobile terminals should be able to handle. For example, in the case of the frequency range so called Sub6, which is 6 GHz (gigahertz) or lower, it is necessary to handle a wide frequency band of 3.3 GHz to 5 GHz, so that it has become necessary to widen the frequency band that mobile terminals and the like can handle. Meanwhile, a carrier aggregation (CA: Carrier Aggregation) technology has become widespread, and it is a technology in which a plurality of frequency bands are used in a bundle. Therefore, when a mobile terminal uses the CA technology, it has also become necessary to widen the frequency band that the mobile terminal can handle. Further, when a mobile terminal is used in an indoor environment or the like in which radio waves are returned, the mobile terminal needs to be able to receive radio waves from all directions, i.e., needs to be omni-directional. Therefore, a mobile terminal needs to be equipped with an antenna that has both a wide-band characteristic and an omni-directional characteristic.

In a mobile radio terminal, since the direction of the base station and the orientation of the mobile terminal itself constantly change and hence it is not known from which direction radio waves arrive, it is common to adopt an omni-directional antenna as the antenna of the mobile terminal. Meanwhile, the thickness of a mobile terminal is often small in consideration of its portability, and in such a case, it is difficult to ensure a sufficient antenna length due to the small thickness of the mobile terminal. For example, when a mobile terminal is placed flat (i.e., placed in a horizontal direction) on a desk, vertical polarization (i.e., vertically-polarized waves) becomes weak. In an antenna, it is important to conform (i.e., adjust) the polarization (i.e., the polarization plane). Therefore, even in the case of an omni-directional antenna, if the polarization is not conformed, the receiving sensitivity deteriorates. That is, in a mobile radio terminal, it is difficult to obtain both horizontal polarization and vertical polarization.

As a solution to this problem, Patent Literature 1 discloses a method using a charging apparatus as a cradle equipped with a passive element. However, in this method, it is necessary to conform the total length of the passive element to a desired frequency. Therefore, since the frequency band in which the effect is obtained is limited, it is difficult to obtain a wide-band property.

A method using a cradle equipped with a passive element is also disclosed in Patent Literature 2 and in Patent Literature 3. Patent Literature 2 discloses, in paragraph [0039], that communication performance is improved at the same time in two frequency bands of 880 MHz (megahertz) and 2.1 GHz. However, Patent Literature 2 does not mention any relationship between re-emission by the passive element, which is formed by a wiring pattern, and polarization.

Patent Literature 3 discloses that the effect of improving the characteristic (the antenna gain) is obtained over a wide frequency band. However, Patent Literature 3 discloses that the emission becomes directional, and does not disclose an omni-directional property. Therefore, it is difficult to solve, by using the method disclosed in Patent Literature 2 or 3, the problem that an antenna that has both a wide-band characteristic and an omni-directional characteristic is required.

Patent Literature 4 discloses a method for obtaining multi-frequency resonance by using a passive element. Specifically, Patent Literature 4 discloses that a micro strip antenna (MSA: Micro Strip Antenna) for multi-frequency resonance is formed by arranging a V-shaped feeding stub and a rhombic passive element on the same plane. However, since the micro strip antenna disclosed in Patent Literature 4 is a directional antenna, it is difficult to use it in a mobile terminal.

Patent Literature 1: Japanese Unexamined Patent Application Publication No. 2017-212685

Patent Literature 2: International Patent Publication No. WO2011/145695

Patent Literature 3: International Patent Publication No. WO2015/141133

Patent Literature 4: Japanese Unexamined Patent Application Publication No. 2008-172697

SUMMARY

As described above, there is a problem that it is difficult to provide an antenna apparatus capable of obtaining horizontal polarization/vertical polarization on all planes over a wide frequency band by using an omni-directional antenna. That is, there is a problem that it is difficult to provide an antenna apparatus including an antenna capable of having both a wide-band characteristic and an omni-directional characteristic.

An object of the present disclosure is to provide an antenna apparatus capable of solving the above-described problem.

An antenna apparatus according to the present disclosure includes a feeding antenna, and a passive element part disposed in a Z-direction of the feeding antenna, in which the passive element part is disposed in parallel to an XY-plane orthogonal to the Z-direction, is made of a conductor, and includes a passive element with a plurality of slots formed therein.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
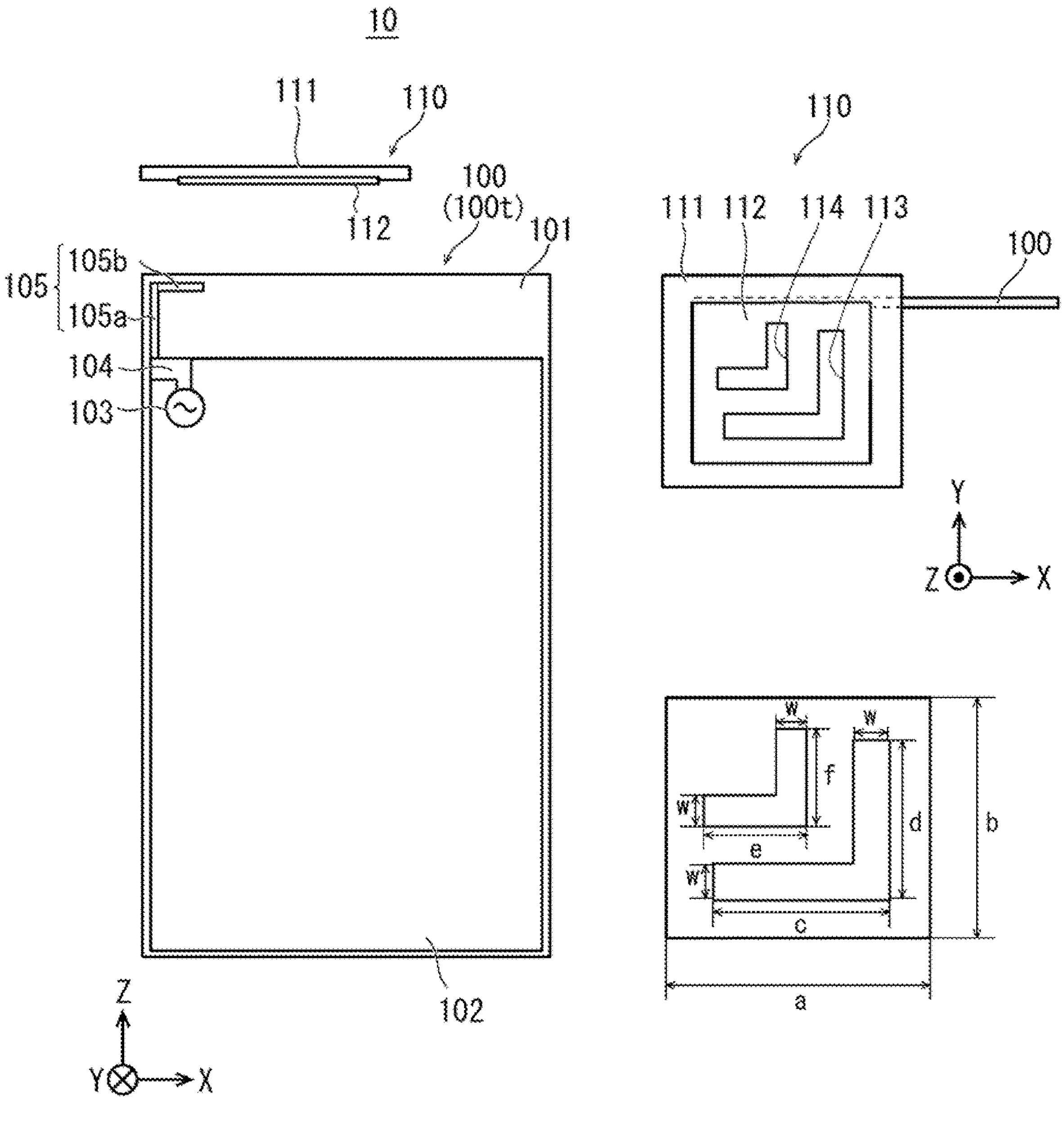
FIG. 1 is a schematic diagram showing an example of an antenna apparatus according to a first example embodiment.

An example embodiment according to the present disclosure will be described hereinafter with reference to the drawings. The same reference numerals (or symbols) are assigned to the same or corresponding elements throughout the drawings, and duplicate descriptions thereof are omitted as appropriate for clarifying the explanation.

First Example Embodiment

<Configuration>

FIG. 1 is a schematic diagram showing an example of an antenna apparatus according to a first example embodiment.

As shown in FIG. 1, an antenna apparatus 10 according to the first example embodiment includes a feeding antenna 105 (a radio device 100*t*), and a passive element part 110 disposed in the Z-direction of the feeding antenna 105 (the radio device 100*t*).

The radio device 100*t* includes a printed circuit board 100 and a housing (not shown) that covers the printed circuit board 100. The printed circuit board 100 includes a dielectric layer 101, a conductor layer 102, a radio circuit (not shown), a feeding point 103, a matching circuit 104, and a feeding antenna 105. The radio circuit is disposed (e.g., formed) on the printed circuit board 100. The radio device 100*t* may be, for example, any of a mobile terminal, a tablet-type terminal, a smartphone, and the like. The printed circuit board may also be simply referred to as a substrate.

The dielectric layer 101 is formed of a dielectric and the conductor layer 102 is formed of a conductor. Each of the dielectric layer 101 and the conductor layer 102 is formed in a single layer or in multiple layers.

The feeding point 103 is a connection point between the radio circuit (not shown) that generates a radio signal and the feeding antenna 105.

The feeding antenna 105 is disposed between the passive element part 110 and the feeding point 103, and emits a radio signal into space (e.g., into the air). The feeding antenna 105 is an inverted L-shaped antenna that extends in the Z-direction from the feeding point 103 (or, when the matching circuit 104 is provided, from the matching circuit 104), and then extends in the X-direction therefrom. Specifically, the feeding antenna 105 is an inverted L-shaped pattern antenna composed of a termination part 105*a* extending in the Z-direction from the matching circuit 104, and a tip part 105*b* that is bent at an angle of 90 degrees toward the X-direction and extends along the edge of the dielectric layer 101. Further, the feeding antenna 105 is disposed in the conductor layer 102.

The matching circuit 104 is disposed between the feeding antenna 105 and the feeding point 103, and is used for impedance matching between the feeding antenna 105 and the radio circuit. Regarding the impedance matching, the impedance is typically adjusted to 50Ω (ohms).

The passive element part 110 includes a dielectric 111 and a passive element 112. The passive element part 110 is disposed at a position including an XY-plane orthogonal to the printed circuit board 100 (a plane orthogonal to the Z-direction). In the example shown in FIG. 1, the printed circuit board 100 is disposed on an XZ-plane, and the passive element part 110 is disposed on the XY-plane. Further, the passive element part 110 is disposed so that the tip part 105*b* of the feeding antenna 105 is parallel to one side of the passive element 112.

The reason for the above-described arrangement is to strengthen the spatial coupling between the feeding antenna 105 and the passive element 112, and thereby to increase a high-frequency current induced in the passive element 112. When the distance between the tip part 105*b* of the feeding antenna 105 and the passive element 112 is increased, the spatial coupling therebetween becomes weak. Therefore, the passive element 112 is preferably disposed near the feeding antenna 105. For example, the distance between them is preferably about one tenth of the wavelength at a desired frequency (a used frequency) or shorter. The distance between the passive element 112 and the feeding antenna 105 may be 0.11 times of the wavelength at the frequency used for the radio signal or shorter. Assuming that the used frequency is up to 5 GHz, one tenth of the wavelength is 6 mm. Therefore, the distance between the tip part 105*b* of the feeding antenna 105 shown in FIG. 1 and the passive element 112 is 6 mm in the horizontal direction (the Z-axis direction).

Instead of being disposed in the Z-direction of the radio device 100*t*, the passive element part 110 may be disposed on the inner surface of the housing of the radio device 100*t* that is opposed to the feeding antenna 105.

Regarding the dielectric 111 and the passive element 112 of the passive element part 110, the dielectric 111 may be formed of a housing and the passive element 112 may be formed of conductive tape. Alternatively, the dielectric 111 may be formed of a dielectric layer of a printed circuit board and the passive element 112 may be formed of a conductor layer of the printed circuit board. The passive element may also be referred to as a parasitic antenna (or a passive antenna).

The parasitic antenna (the passive element 112) may be disposed inside a charger that also serves as a cradle for the mobile terminal (the radio device **100*t*), and operated (i.e., used) as the passive element part 110**.

Note that although the above description has been given on the assumption that the passive element part 110 is located outside the radio device **100*t* and is located, for example, inside the cradle, the configuration of the antenna apparatus is not limited to this example. The passive element part 110 may be disposed inside the radio device 100*t***.

The dielectric 111 is a dielectric disposed parallel to the XY-plane orthogonal to the Z-direction. Although the dielectric 111 is disposed between the passive element 112 and the feeding antenna 105 in FIG. 1, the configuration of the antenna apparatus is not limited to this example. That is, the dielectric 111 may be disposed in the Z-direction of the passive element 112. The dielectric 111 is disposed between the passive element 112 and the feeding antenna 105, or disposed in the Z-direction of the passive element 112.

The passive element 112 is disposed parallel to the XY-plane orthogonal to the Z-direction, is made of a conductor, and includes a plurality of slots. The plurality of slots include a first slot 113 and a second slot 114 (i.e., the first and second slot 113 and 114 are provided (i.e., formed) in the passive element 112). The material of the passive element 112 is preferably a material containing a conductor having a low surface resistivity, for example, a material containing at least one of gold, silver, copper, and aluminum.

The first and second slot 113 and 114, among the plurality of slots, are parts in which there is no conductor. Each of the first and second slot 113 and 114 has such a shape that the slot is bent at or near the center so that a tip (one end) thereof gets closer to (i.e., extends toward) one of the sides of the passive element 112. That is, the first slot 113 extends in the X-direction orthogonal to the Z-direction, and then extends in the Y direction orthogonal to the X- and Z-directions therefrom. The second slot 114 extends in the X-direction and then extends in the Y-direction therefrom. The length of the first slot 113 is longer than the length of the second slot 114. The sizes of the passive element 112 shown in FIG. 1 are, for example, as follows: a=b=29.5 mm (millimeters); c=d=20 mm; e=f=12 mm; and the slot width w=4 mm.

The length of the first slot 113 in the X-direction is longer than the length of the second slot 114 in the X-direction. The length of the first slot 113 in the Y-direction is longer than the length of the second slot 114 in the Y-direction.

The length of the first slot 113 is equal to a half-wavelength length at a first frequency used for the radio signal. The length of the second slot 114 is equal to a half-wavelength length at a second frequency used for the radio signal.

Figure 2:
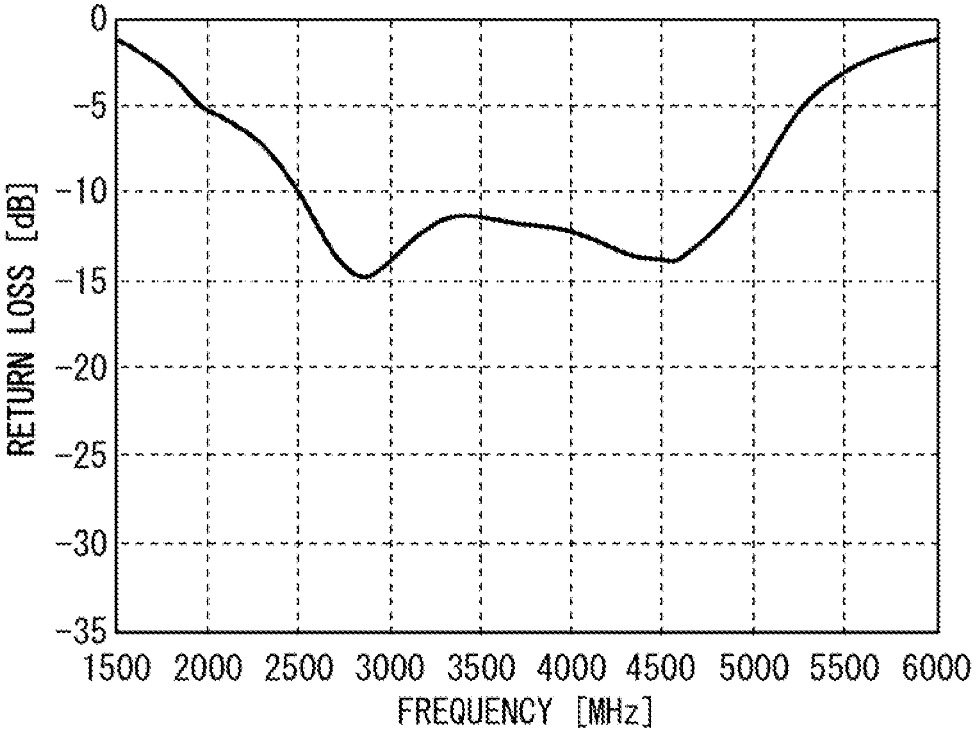
FIG. 2 is a graph showing an example of return losses in a printed circuit board.

FIG. 2 is a graph showing an example of return losses in a printed circuit board.

In FIG. 2, the horizontal axis indicates frequencies, and the vertical axis indicates return losses.

FIG. 2 shows return losses of the feeding antenna 105 as being observed from the feeding point 103 in the case where only the radio device **100*t* (the printed circuit board 100) is provided in the antenna apparatus 10 shown in FIG. 1, i.e., in the case where the passive element part 110 is not provided in the antenna apparatus 10**. The return loss is also referred to as a return loss (RL: Return Loss) or a reflectivity.

The return loss is one of the indices indicating the characteristics of an antenna, and is obtained by a calculation formula "$10\times\mathrm{Log}_{10}$ (Returned Power/Incident Power)". Since the returned power is equal to or smaller than the input power, the sign of the returned loss is negative and the unit thereof is dB (decibel). The smaller the value of the return loss is, the less the incident power is returned, and hence the more the incident power is emitted into the air. In general, when the return loss is −5 dB or smaller, the feeding antenna satisfactorily functions as an antenna.

As shown in FIG. 2, the return loss is −10 dB or smaller in a frequency band of 2.5 GHz to 5 GHz. Therefore, it can be said that the feeding antenna 105 satisfactorily functions over a range of 2.5 GHz to 5 GHz.

<Operation>

Figure 3A:
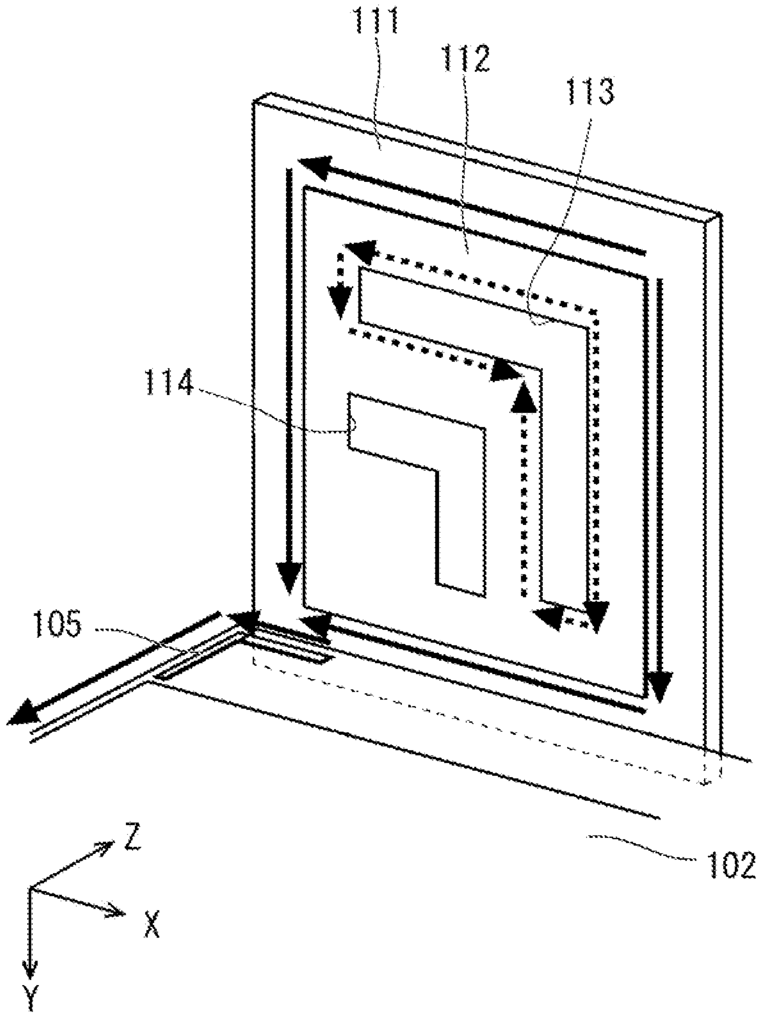
FIG. 3A is a schematic diagram showing an example of, when a high-frequency current is fed to a feeding antenna according to the first example embodiment, the high-frequency current flowing through the feeding antenna, a conductor layer, and a passive element.

FIG. 3A is a schematic diagram showing an example of, when a high-frequency current is fed to the feeding antenna according to the first example embodiment, the high-frequency current flowing through the feeding antenna, a conductor layer, and a passive element.

Figure 3B:
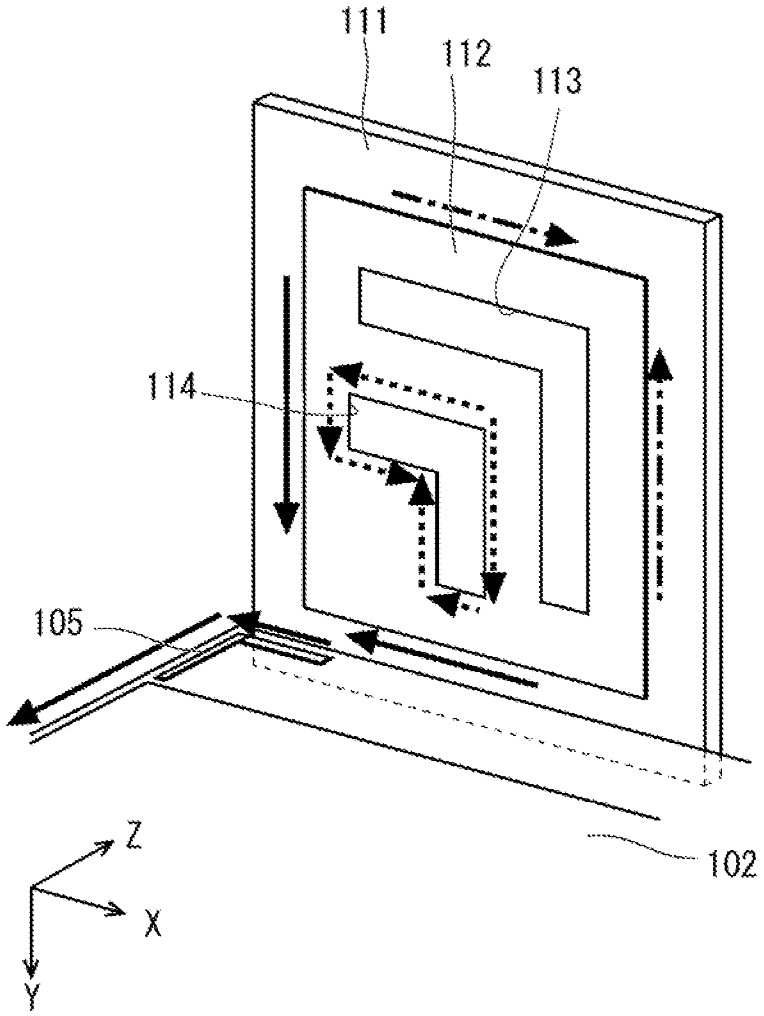
FIG. 3B is a schematic diagram showing an example of, when a high-frequency current is fed to the feeding antenna according to the first example embodiment, the high-frequency current flowing through the feeding antenna, the conductor layer, and the passive element.

FIG. 3B is a schematic diagram showing an example of, when a high-frequency current is fed to the feeding antenna according to the first example embodiment, the high-frequency current flowing through the feeding antenna, the conductor layer, and the passive element.

As shown in FIGS. 3A and 3B, when a high-frequency current is fed to the feeding antenna 105, the high-frequency current flows through the feeding antenna 105 and a part of the conductor layer 102 located therearound (indicated by solid arrows), and a high-frequency current is also induced in the passive element 112 disposed near the feeding antenna 105.

The high-frequency current induced in the passive element 112 resonates at a frequency at which the slot length becomes equal to one half wavelength (a half wavelength), and flows in the slot part in a concentrated manner (indicated by dotted arrows). The length of the first slot 113 is 40 mm (=c+d), and the length of the second slot 114 is 24 mm (=e+f). Therefore, the resonance frequency of the slot under normal conditions is about 3.8 GHz and 6 GHz. However, since the passive element 112 is in contact with the dielectric 111, the resonance frequency is affected by wavelength shortening. Therefore, when the relative dielectric constant of the dielectric 111 is 3, the first slot 113 resonates at about 2.8 GHz and the second slot 114 resonates at about 4.2 GHz.

FIG. 3A is a schematic diagram (a simplified image) showing an example of the high-frequency current at 2.8 GHz. At the frequency of 2.8 GHz, the high-frequency current is concentrated in the first slot 113. In this state, two one-half wavelength current distributions in each of which the current at the tip part of the first slot 113 is large occur. Further, by disposing the tip part in which the high-frequency current is large on the edge of the passive element 112, a high-frequency current of which the direction is the same as (i.e., parallel to) that of the current flowing at the tip of the first slot 113 is induced on the edge of the passive element 112. As a result, a one-half wavelength high-frequency current indicated by solid lines in which the current at or near the tip part of the first slot 113 is large is generated on each of the upper, the left, the right, and the lower sides of the passive element 112 as viewed from a position on the opposite side in the Z-direction. Since this high-frequency current includes currents flowing in the Y-direction, it contributes to the vertical polarization on the XZ-plane.

FIG. 3B is a schematic diagram (a simplified image) showing an example of the high-frequency current at 4.2 GHz. At the frequency of 4.2 GHz, the high-frequency current is concentrated in the second slot 114. In this state, similarly to the frequency of 2.8 GHz, two one-half wavelength current distributions in each of which the current at the tip part of the second slot 114 is large occur. Further, by the high-frequency current at the tip part of the second slot 114, a one-half wavelength current distribution indicated by solid lines occurs on each of the left and lower sides of the passive element 112 as viewed from a position on the opposite side in the Z-direction. However, in the case of 4.2 GHz, in contrast to 2.8 GHz, a one-half wavelength high-frequency current indicated by chain lines is also generated on each of the upper and right sides of the passive element 112. Although the phase of the high-frequency current indicated by the solid lines and that of the high-frequency current indicated by the chain lines are opposite to each other, the current indicated by the solid lines at or near the tip of the second slot 114 is larger and hence is not canceled out. Therefore, the high-frequency current indicated by the solid lines contributes to the emission, thus making it possible to obtain the vertical polarization on the XZ-plane.

<Effect>

Figure 4:
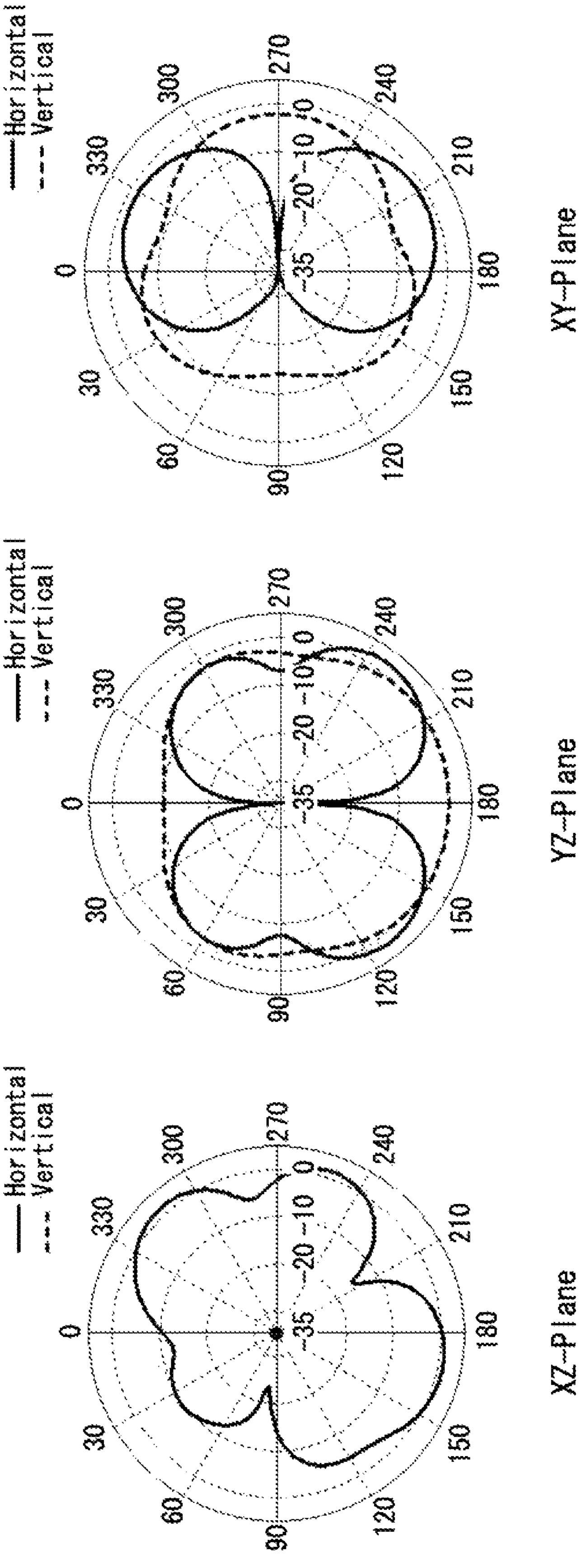
FIG. 4 shows graphs showing examples of emission patterns in a printed circuit board.

FIG. 4 shows graphs showing examples of emission patterns in a printed circuit board.

FIG. 4 shows emission patterns on three planes (XZ-plane/YZ-plane/XY-plane) of the feeding antenna 105 at 2.8 GHz in the case where only the radio device 100*t* (the printed circuit board 100) is provided in the antenna apparatus 10 shown in FIG. 1, i.e., in the case where the passive element part 110 is not provided in the antenna apparatus 10.

As shown in FIG. 4, horizontal polarization is obtained on each of the XZ-, YZ-, and XY-planes, but vertical polarization is not obtained on the XZ-plane.

Figure 5:
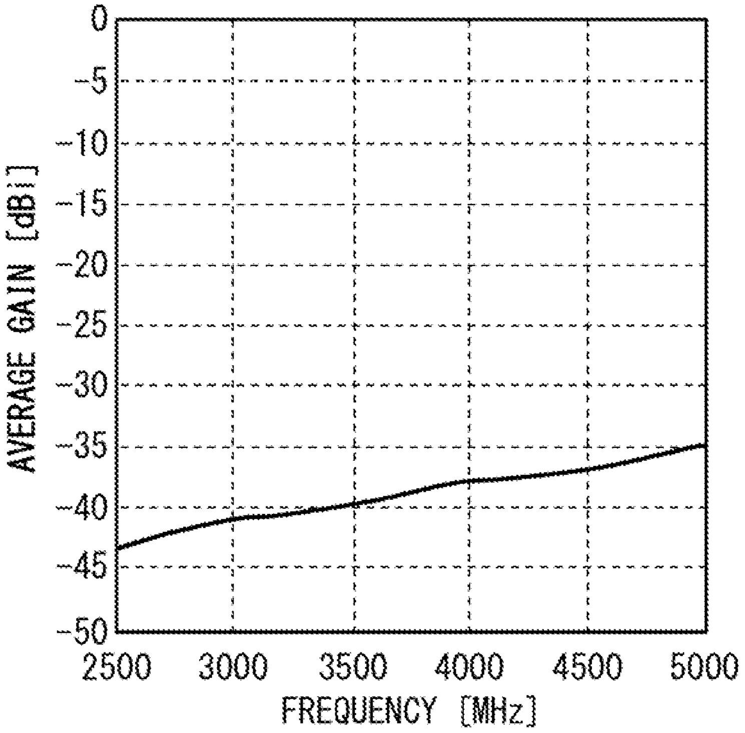
FIG. 5 is a graph showing an example of average gains of the printed circuit board.

FIG. 5 is a graph showing an example of average gains in a printed circuit board.

FIG. 5 is a graph showing an example of average gains of vertical polarization on the XZ-plane shown in FIG. 4. In FIG. 5, the horizontal axis indicates frequencies, and the vertical axis indicates average gains. The unit of the average gain is dBi (decibels per isotropic) in order to show the absolute gain of the antenna.

As shown in FIG. 5, the average gain of the printed circuit board is very low, i.e., about −40 dBi in a frequency range of 2.5 GHz to 5 GHz.

Figure 6:
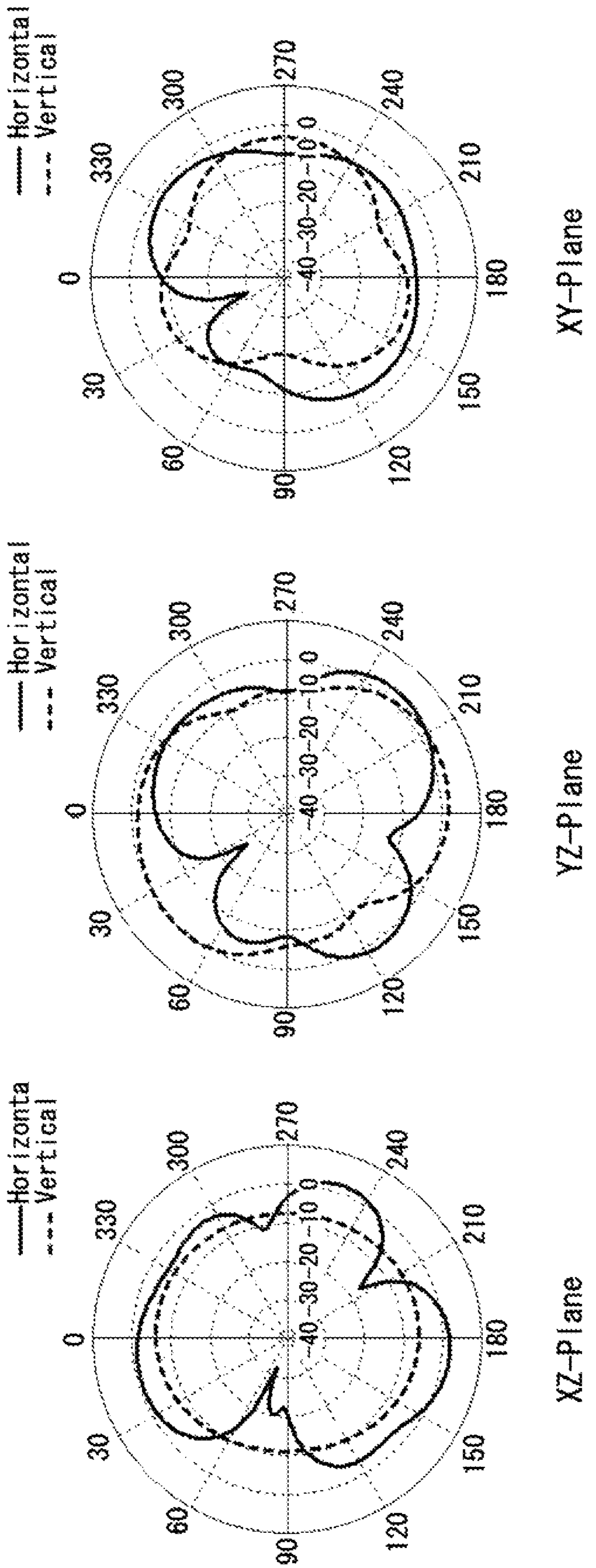
FIG. 6 shows graphs showing examples of emission patterns in an antenna apparatus according to the first example embodiment.

FIG. 6 shows graphs showing examples of emission patterns in the antenna apparatus according to the first example embodiment.

FIG. 6 shows emission patterns on three planes (XZ-plane/YZ-plane/XY-plane) at 2.8 GHz in the antenna apparatus 10 shown in FIG. 1.

As shown in FIG. 6, unlike the emission patterns in the printed circuit board shown in FIG. 4, vertical polarization occurs on the XZ-plane in the emission patterns in the antenna apparatus 10.

Figure 7:
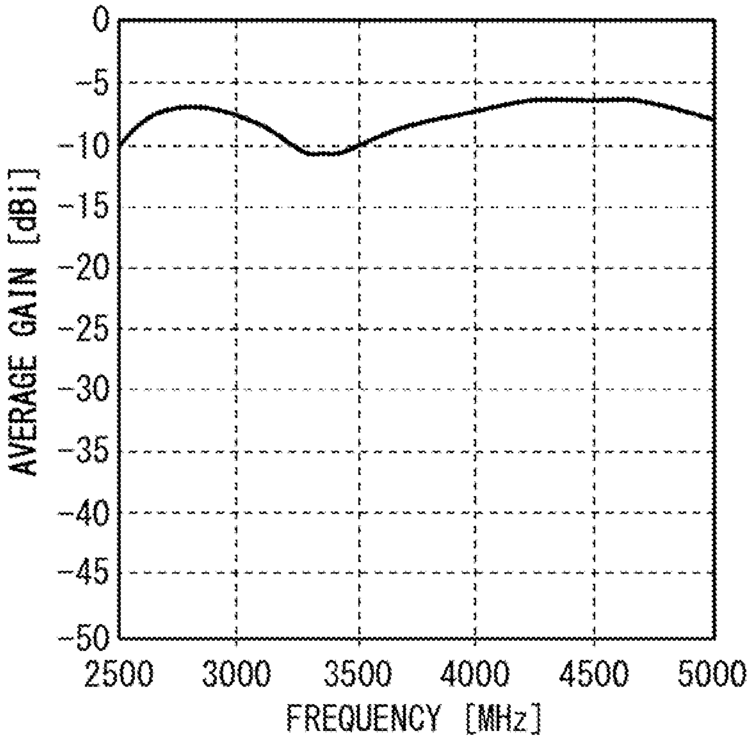
FIG. 7 is a graph showing an example of average gains of the antenna apparatus according to the first example embodiment.

FIG. 7 is a graph showing an example of average gains of the antenna apparatus according to the first example embodiment.

FIG. 7 shows the average gains of the vertical polarization on the XZ-plane in a range of 2.5 GHz to 5 GHz in the antenna apparatus 10 shown in FIG. 1. In FIG. 7, the horizontal axis indicates frequencies, and the vertical axis indicates average gains.

As shown in FIG. 7, the average gains of the vertical polarization on the XZ-plane in the antenna apparatus 10 are increased over all the frequencies as compared to the average gains in the case where only the printed circuit board 100 is provided as shown in FIG. 5.

Figure 8:
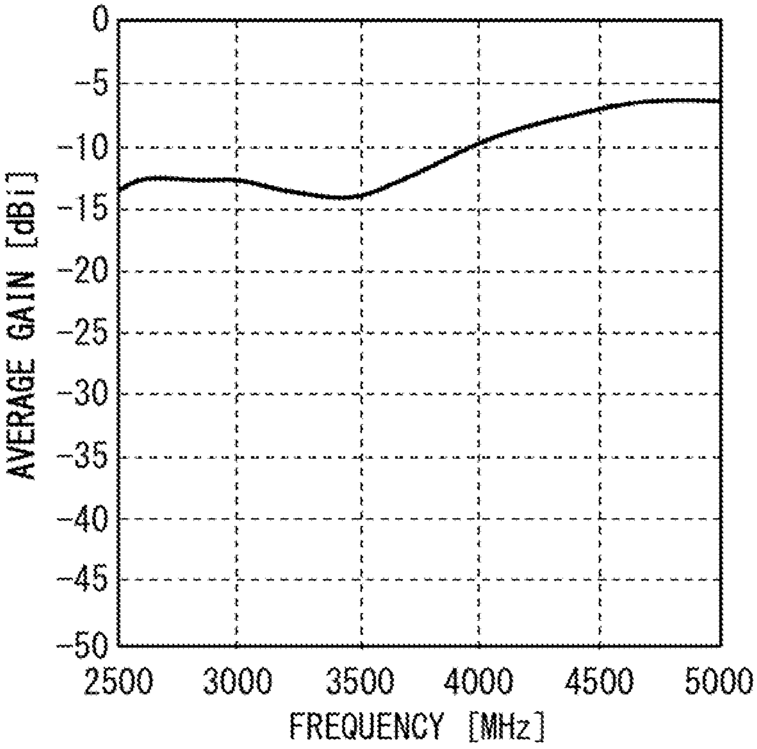
FIG. 8 is a graph showing an example of average gains of an antenna apparatus in which the passive element includes no slot.

FIG. 8 is a graph showing an example of average gains of the antenna apparatus in the case where the passive element includes no slot.

FIG. 8 shows average gains of vertical polarization on the XZ-plane in a range of 2.5 GHz to 5 GHz in the antenna apparatus 10 shown in FIG. 1 in which the passive element 112 does not include the first and second slot 113 and 114.

As shown in FIG. 8, the average gains of the antenna apparatus on the XZ-plane in the case where the passive element includes no slot are increased over all the frequencies as compared to the average gains in the case where only the printed circuit board 100 is provided as shown in FIG. 5. However, as compared to the average gains in the case of the antenna apparatus 10 shown in FIG. 7, there is a difference of 6 dB or larger at or near 2.8 GHz. When this difference converted into a difference, it is about twice the distance in the case of the antenna apparatus 10 shown in FIG. 7.

When the passive element 112 is simply disposed near the feeding antenna 105, it was impossible to obtain the required characteristics (an omni-directional emission pattern and an average gain equal to or higher than a predetermined gain). However, as shown in FIGS. 6 and 7, by adopting the configuration of the antenna apparatus 10 according to the first example embodiment, it becomes possible to obtain the emission pattern and the average gain required for the horizontal polarization and the vertical polarization on all the planes (XZ-plane/YZ-plane/XY-plane) over a wide frequency band.

As a result, according to the first example embodiment, it is possible to provide an antenna apparatus including an antenna capable of having both a wide-band characteristic and an omni-directional characteristic. Therefore, the antenna apparatus 10 according to the first example embodiment can be used as an antenna of a communication apparatus such as those in conformity with a 3G/4G/5G/Wireless LAN (Local Area Network).

Note that the length of the outer shape of the passive element 112 may be made longer than one wavelength of the lower-limit frequency of the used frequency band.

Further, the length of the first slot 113 or the second slot 114 may be made equal to one half of the wavelength at a predetermined frequency selected from a plurality of frequency bands to be used.

Further, the feeding antenna 105 may be disposed so that its tip part 105*b* is parallel to one of the sides of the passive element 112.

Features of the antenna apparatus 10 according to the first example embodiment will be described hereinafter.

The antenna apparatus 10 includes a thin radio device 100*t* in which a feeding antenna 105 is provided, and a passive element 112 including a first slot 113 and a second slot 114 disposed near the feeding antenna 105 and perpendicular to the feeding antenna 105. Further, by spatially coupling the feeding antenna 105 with the passive element 112, a radio wave generated by a high-frequency current flowing in the Y-direction (the thickness direction of the radio device 100*t*), which would otherwise be weak by the feeding antenna 105 alone, is strengthened in a plurality of frequency bands, so that the frequency band is widened.

Further, features of the antenna apparatus 10 according to the first example embodiment from other viewpoints will be described hereinafter.

In the antenna apparatus 10, a passive element 112 of which the length of the outer shape is adjusted to one wavelength at a frequency F0 or larger is disposed near an omni-directional feeding antenna 105 of which the used frequency is in a rage of F0 [GHz] to F1 [GHz] in such a manner that the passive element 112 has a plane (i.e., a surface) different from that of the feeding antenna 105.

One or a plurality of bending slots are provided (i.e., formed) in the passive element 112.

The length of the slot(s) (the slot length(s)) is made equal to one half of the wavelength at a frequency in a range of F0 to F1.

In this way, when a high-frequency current is fed to the feeding antenna 105, the high-frequency current flows to the slot(s) of the passive element 112, and a high-frequency current is induced on the edge of the passive element 112 by the aforementioned high-frequency current, so that a radio wave is emitted into space (i.e., into the air). Further, by the emission from the feeding antenna 105 and the passive element 112, it is possible to obtain horizontal polarization and vertical polarization in a multi-plane manner over a wide frequency band.

Note that the slot(s) is bent in order to reduce the length of the outer shape of the passive element 112, and in order to dispose the tip part where the current is large near the edge of the passive element 112 and thereby to induct a current on the edge of the passive element 112.

Second Example Embodiment

<Configuration>

Figure 9:
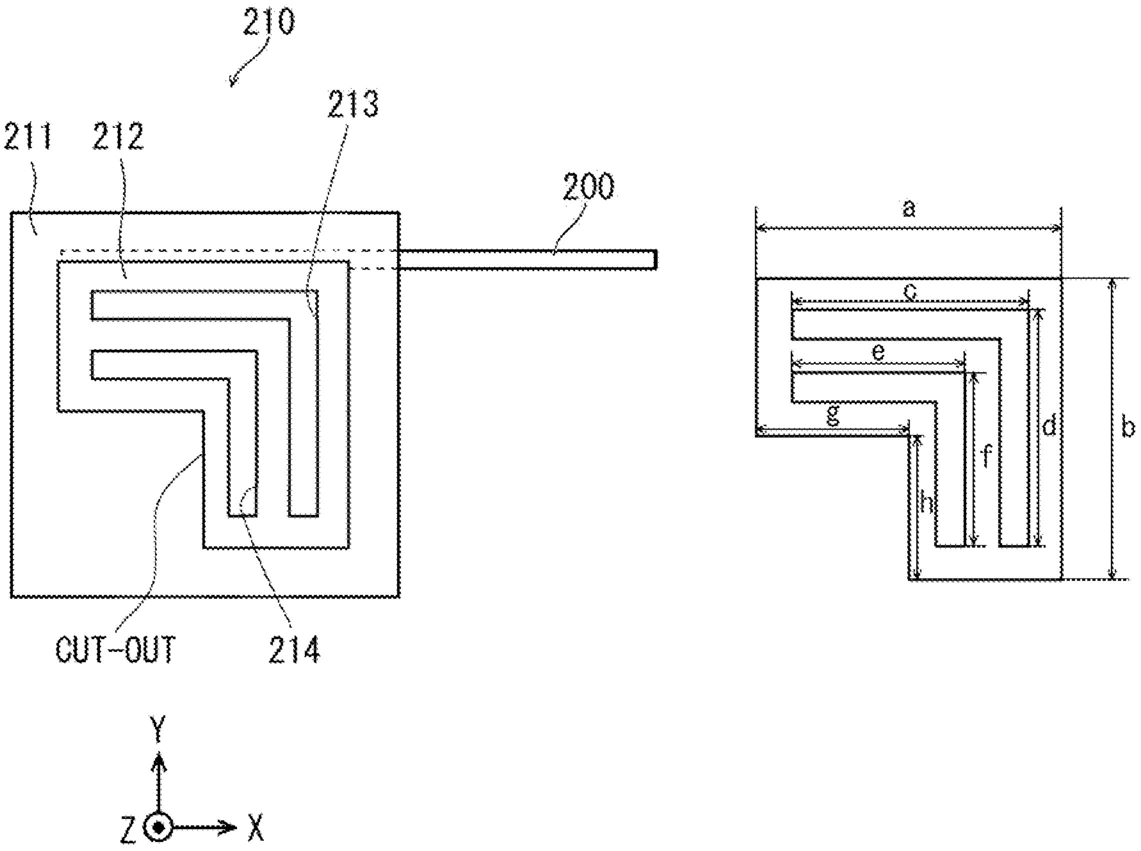
FIG. 9 is a schematic diagram showing an example of a passive element part of an antenna apparatus according to a second example embodiment.

FIG. 9 is a schematic diagram showing an example of a passive element part of an antenna apparatus according to a second example embodiment.

As shown in FIG. 9, in a passive element part 210 according to the second example embodiment, the orientation of slots is different from that of the slots of the passive element part 110 according to the first example embodiment.

The passive element part 210 includes a dielectric 211, and a passive element 212 made of a conductor. The passive element 212 has such a shape that one of the four corners of a square (or a rectangle) is cut out. The passive element 212 includes a first slot 213 and a second slot 214. Each of the first and second slots 213 and 214 has such a shape that a tip of the slot is bent so as to get closer to (i.e., extend toward) the edge of a different side of the passive element 212. That is, the passive element 212 has a cut-out in a part thereof on the opposite side in the X-direction and on the opposite side in the Y-direction as viewed in the Z-direction. The first slot 213 extends in the X-direction orthogonal to the Z-direction, and then extends in the direction opposite to the Y-direction (i.e., toward the negative side in the Y-direction) orthogonal to the X- and Z-directions therefrom. The second slot 214 extends in the X-direction and then extends in the direction opposite to the Y-direction therefrom. The length of the first slot 213 is longer than the length of the second slot 214. The sizes of the passive element 212 shown in FIG. 9 are as follows: a=b=29 mm; c=d=23 mm; e=f=17 mm; and g=h=14 mm. Further, the distance between the feeding antenna 205 and the passive element 212 is 6 mm in the Z-direction.

Figure 10A:
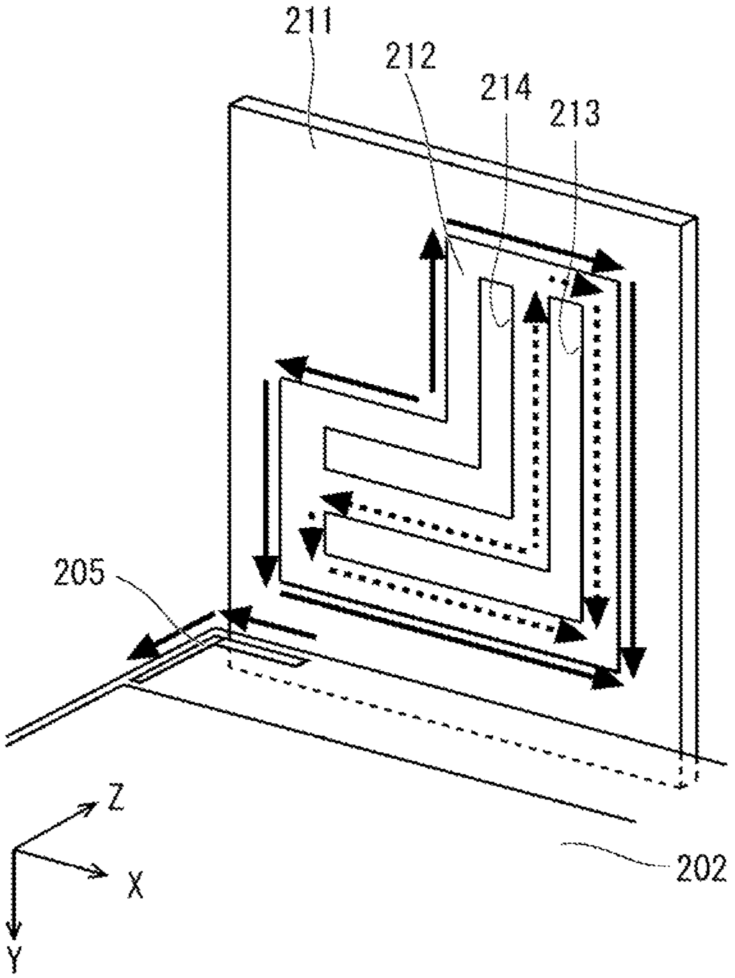
FIG. 10A is a schematic diagram showing an example of, when a high-frequency current is fed to a feeding antenna according to the second example embodiment, the high-frequency current flowing through the feeding antenna, a conductor layer, and a passive element.

FIG. 10A is a schematic diagram showing an example of, when a high-frequency current is fed to the feeding antenna according to the second example embodiment, the high-frequency current flowing through the feeding antenna, a conductor layer, and a passive element.

FIG. 10A shows a case of 2.8 GHz.

Figure 10B:
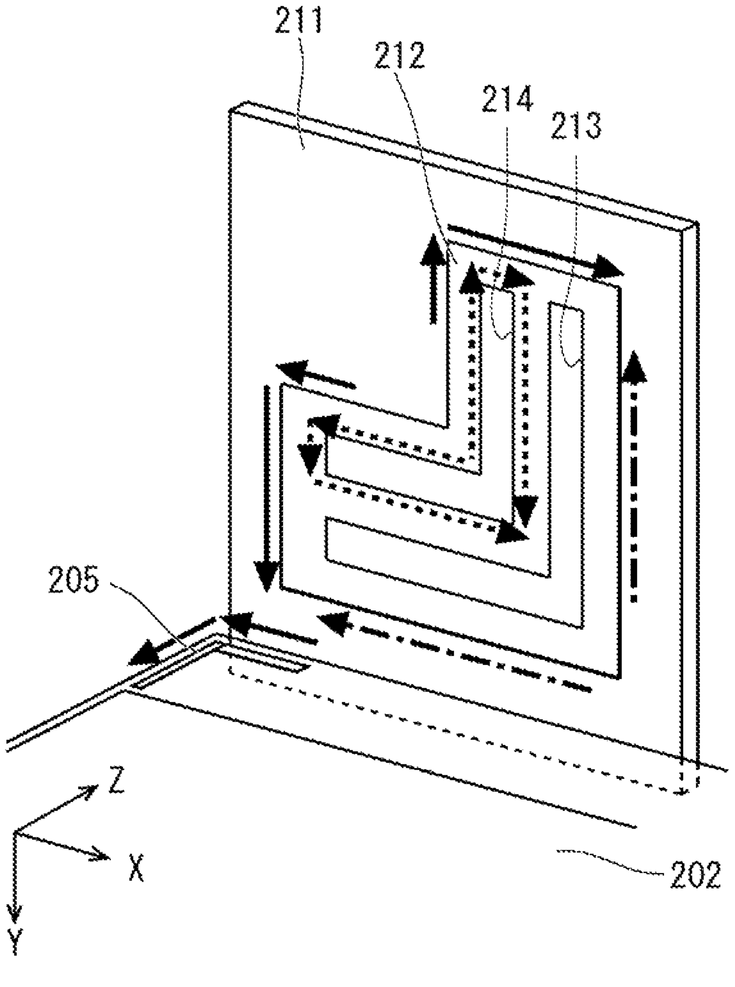
FIG. 10B is a schematic diagram showing an example of, when a high-frequency current is fed to the feeding antenna according to the second example embodiment, the high-frequency current flowing through the feeding antenna, the conductor layer, and the passive element.

FIG. 10B is a schematic diagram showing an example of, when a high-frequency current is fed to the feeding antenna according to the second example embodiment, the high-frequency current flowing through the feeding antenna, the conductor layer, and the passive element. FIG. 10B shows a case of 3.8 GHz.

As shown in FIG. 10A, the operation (i.e., the behavior) of the passive element 212 is similar to the operation of the passive element 112 shown in FIG. 3A. As shown in FIG. 10B, the operation (i.e., the behavior) of the passive element 212 is similar to the operation of the passive element 112 shown in FIG. 3B. The resonance frequency is determined according to the length of the first slot 213, and the high-frequency current is concentrated in the first slot 213 at the resonance frequency. The resonance frequency is determined according to the length of the second slot 214, and the high-frequency current is concentrated in the second slot 214 at the resonance frequency. A one-half wavelength (half-wavelength) high-frequency current is induced on the edge of the passive element 212 by large currents flowing in the tip parts of the first and second slots 213 and 214, respectively.

Figure 11:
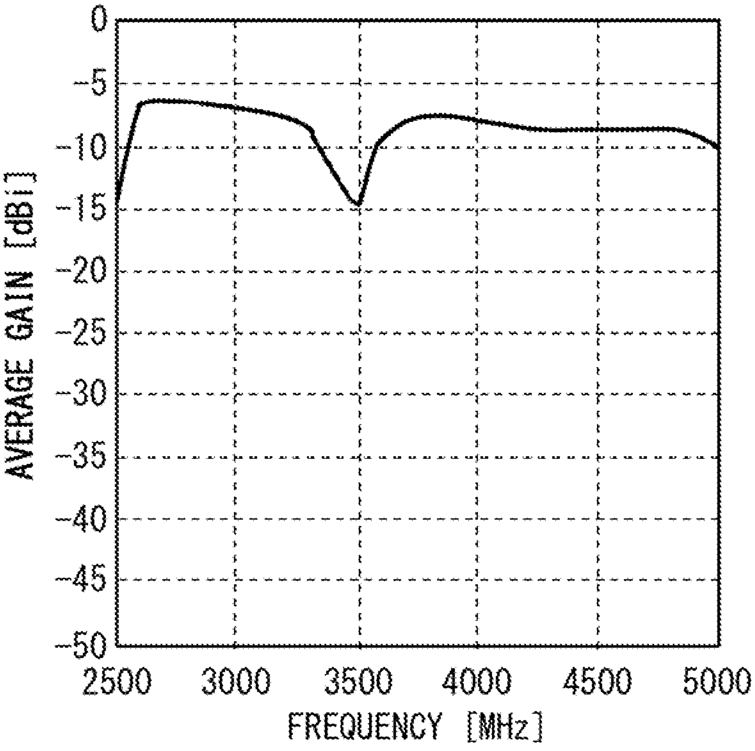
FIG. 11 is a graph showing an example of average gains of the antenna apparatus according to the second example embodiment.

FIG. 11 is a graph showing an example of average gains of the antenna apparatus according to the second example embodiment.

FIG. 11 shows an average gain of vertical polarization on the XZ-plane in a range of 2.5 GHz to 5 GHz in the passive element 212 shown in FIG. 9.

As shown in FIG. 11, the vertical polarization on the XZ-plane is obtained over a wide frequency band. As described above, in the antenna apparatus 20 according to the second example embodiment, it is possible to adjust the frequency band at which the effect is obtained by changing each of the sizes (i.e., each of the lengths) of the passive element 212 and/or by the cut-out thereof.

Although the present disclosure is described above with reference to example embodiments, the present disclosure is not limited to the above-described example embodiments. Various modifications that can be understood by those skilled in the art can be made to the configuration and details of the present disclosure within the scope of the disclosure.

Note that the present disclosure is not limited to the above-described example embodiments, and they may be modified as appropriate without departing from the scope and spirit of the invention.

The first and second embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

According to the present disclosure, it is possible to provide an antenna apparatus including an antenna capable of having both a wide-band characteristic and an omni-directional characteristic.

10, 20 ANTENNA APPARATUS
100*t* RADIO DEVICE
100 PRINTED CIRCUIT BOARD
101 DIELECTRIC LAYER
102, 202 CONDUCTOR LAYERS
103 FEEDING POINT
104 MATCHING CIRCUIT
105, 205 FEEDING ANTENNAS
105*a* TERMINATION PART
105*b* TIP PART
110, 210 PASSIVE ELEMENT PART
111, 211 DIELECTRIC

112, 212 PASSIVE ELEMENT
113, 213 FIRST SLOT
114, 214 SECOND SLOT

What is claimed is:

1. An antenna apparatus comprising a feeding antenna, a passive element part disposed in a Z-direction of the feeding antenna, and a radio device, wherein the passive element part is disposed parallel to an XY-plane orthogonal to the Z-direction, is made of a conductor, and includes a passive element with a plurality of slots formed therein, the radio device includes:

a radio circuit configured to generate a radio signal; and a feeding point configured to serve as a connection point between the radio circuit and the feeding antenna, wherein the feeding antenna is disposed between the passive element part and the feeding point, and the feeding antenna is configured to emit the radio signal into space, and the feeding antenna is an inverted L-shaped antenna extending in the Z-direction from the feeding point, and then extending in an X-direction therefrom.

2. The antenna apparatus according to claim 1, wherein the passive element part further comprises a dielectric disposed between the passive element and the feeding antenna, or disposed in the Z-direction.

3. The antenna apparatus according to claim 1, wherein the first slot among the plurality of slots extends in an X-direction orthogonal to the Z-direction, and then extends in a Y-direction orthogonal to the X- and Z-directions therefrom, and a second slot among the plurality of slots extends in the X-direction and then extends in the Y-direction therefrom.

4. The antenna apparatus according to claim 1, wherein the passive element includes a cut-out in a part thereof on an opposite side in the X-direction and on an opposite side in the Y-direction as viewed in the Z-direction, the first slot among the plurality of slots extends in the X-direction orthogonal to the Z-direction, and then extends in a direction opposite to the Y-direction orthogonal to the X- and Z-directions therefrom, and the second slot among the plurality of slots extends in the X-direction and then extends in the direction opposite to the Y-direction therefrom.

5. The antenna apparatus according to claim 1, further comprising a matching circuit disposed between the feeding antenna and the feeding point, the matching circuit provided for impedance matching between the feeding antenna and the radio circuit.

6. The antenna apparatus according to claim 1, wherein a length of a first slot among the plurality of slots is equal to a length of a half-wavelength at a first frequency used for the radio signal, and a length of a second slot among the plurality of slots is equal to a length of a half-wavelength at a second frequency used for the radio signal.

* * * * *